Sept. 22, 1931. S. HIRSCH ET AL 1,824,269
POSITIONING DEVICE FOR USERS OF AUTOMATIC PHOTOGRAPHIC MACHINES
Filed March 20, 1929
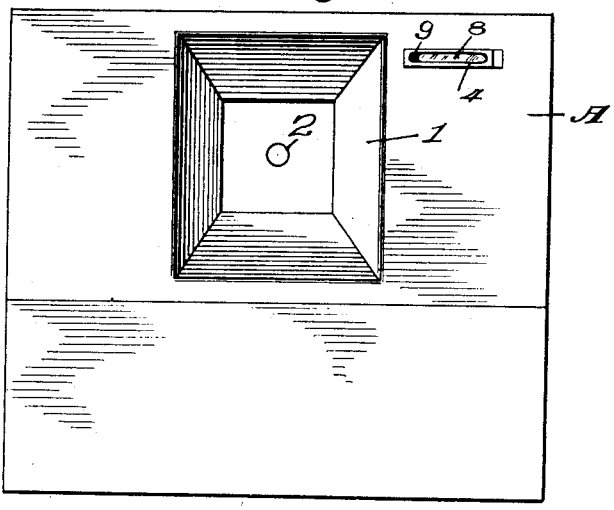
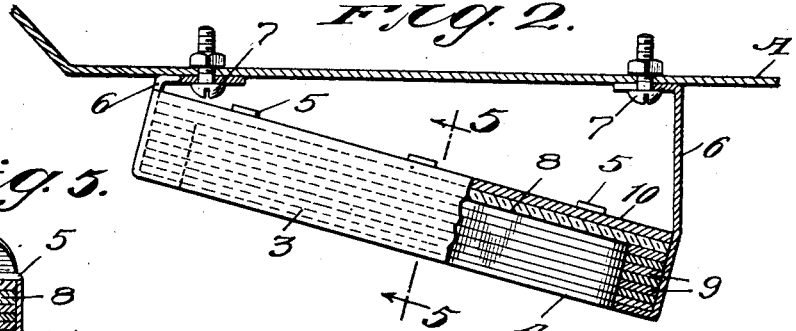
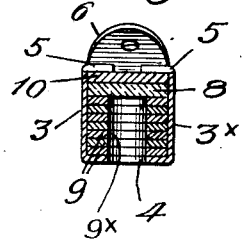
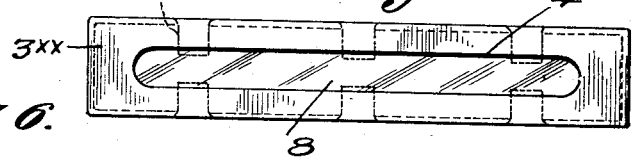
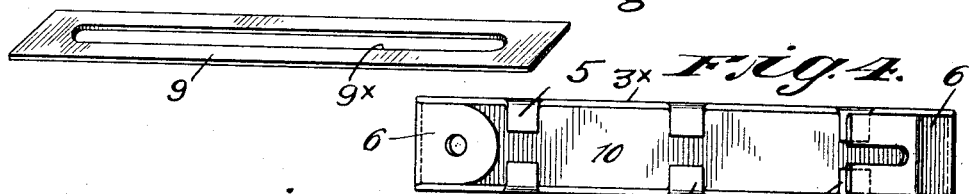
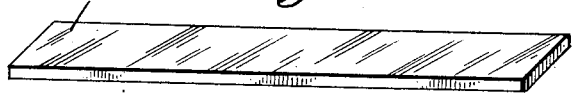
INVENTOR
Sidney Hirsch and John
BY F. Singer
H. Lee Herns
ATTORNEY Patented Sept. 22, 1931

1,824,269

UNITED STATES PATENT OFFICE

SIDNEY HIRSCH, OF NEW YORK, N. Y., AND JOHN F. SINGER, OF NUTLEY, NEW JERSEY, ASSIGNORS TO PHOTOMATON, INC., OF NEW YORK, N. Y., A CORPORATION OF NEW YORK

POSITIONING DEVICE FOR USERS OF AUTOMATIC PHOTOGRAPHIC MACHINES

Application filed March 20, 1929. Serial No. 348,429.

In automatic photographic apparatus there is customarily employed a seat for the subject, which seat may be raised or lowered in order to properly carry the bust of the sitter within the photographic range of the machine. If the seat is raised too high, the top of the head, or, for example, the upper portion of a woman's hat, may be raised above the focus and thus not be shown on the photograph. If the seat is too low, the subject will not be centered on the photograph, the latter will omit part of the subject which should be shown. This has been such a problem that, in the past, it has been customary to employ operators for raising and lowering the seats to properly position the subjects. By means of the present invention the subject may accurately determine the proper position.

The invention will be described with reference to the accompanying drawing, in which—

Figure 1 is a view in elevation showing the front panel of an automatic photographic machine installed with the device constructed in accordance with the invention;

Figure 2 is an enlarged view of the improved device, in plan and partly in section;

Figure 3 is a view in front elevation of the device, and

Figure 4 is a rear elevation thereof;

Figure 5 is a transverse section on the line 5—5, Fig. 2;

Figure 6 is a perspective view of one of the spacing plates, and

Figure 7 is a perspective view of the mirror.

In the drawings A indicates the front casing of an automatic photographic machine and 1 the hood projecting forwardly of the camera lens, the latter being indicated at 2. Secured to the casing A at the side of hood 1 is a casing comprising the top wall 3, the bottom wall 3x and the front wall 3xx, the latter wall being formed with a longitudinal narrow aperture 4. In practice the aperture may be approximately one-fourth inch in width.

The top and bottom walls 3, 3x may be provided with prongs 5 and the side walls of the device may be provided with bracket arms 6 by means of which the device may be secured to casing A through the intermediary of the bolts 7.

Within the casing and at the rear thereof and spaced from the front wall 3xx is a mirror 8. The spacing may be effected by one or a plurality of spacing plates 9, each plate having an aperture 9x corresponding with the aperture in casing wall 3xx. Rearwardly of the mirror may be placed a protecting plate 10 and the prongs 5 may then be bent down in position upon plate 10, so as to hold the assembly.

By the arrangement just described the mirror 8 is hooded in such manner that should the casing wall A be slightly inclined forwardly or rearwardly, that will not affect the operation of the device for the reasons hereinafter set forth.

In the operation of the device the sitter will raise or lower himself until he can see his eyes through the aperture in plate 3xx and as reflected by the mirror, which will inform him that the correct position has been reached. The sitter cannot see his eyes until they are level with the mirror since the mirror is hooded, and the hood further compensates for any slight inclination of the casing wall which otherwise would enable the sitter to see his eye-reflection angularly below or above a horizontal plane intersecting the mirror.

Having described our invention what we claim and desire to secure by Letters Patent is as follows:—

1. In a device of the character described, a casing having top, bottom and front walls, the front wall being formed with a longitudinal relatively narrow aperture, a mirror in said casing, means for spacing the mirror rearwardly of said front wall so that the top and bottom walls provide a hood for the mirror, and means for securing the casing to the front of a photographic machine.

2. In devices of the character set forth, a relatively narrow rectangular box-like casing having an aperture formed in a wall thereof, the aperture being relatively narrow and extending longitudinally of said casing, a mirror carried rearwardly of the casing, and a bracket device for securing the casing to the front wall of a photographic machine.

In testimony whereof, we have signed our names to this specification.

SIDNEY HIRSCH.
JOHN F. SINGER.